Jan. 19, 1943. C. L. EKSERGIAN 2,308,500
BRAKING SYSTEM AND CONTROL THEREFOR
Filed May 1, 1939
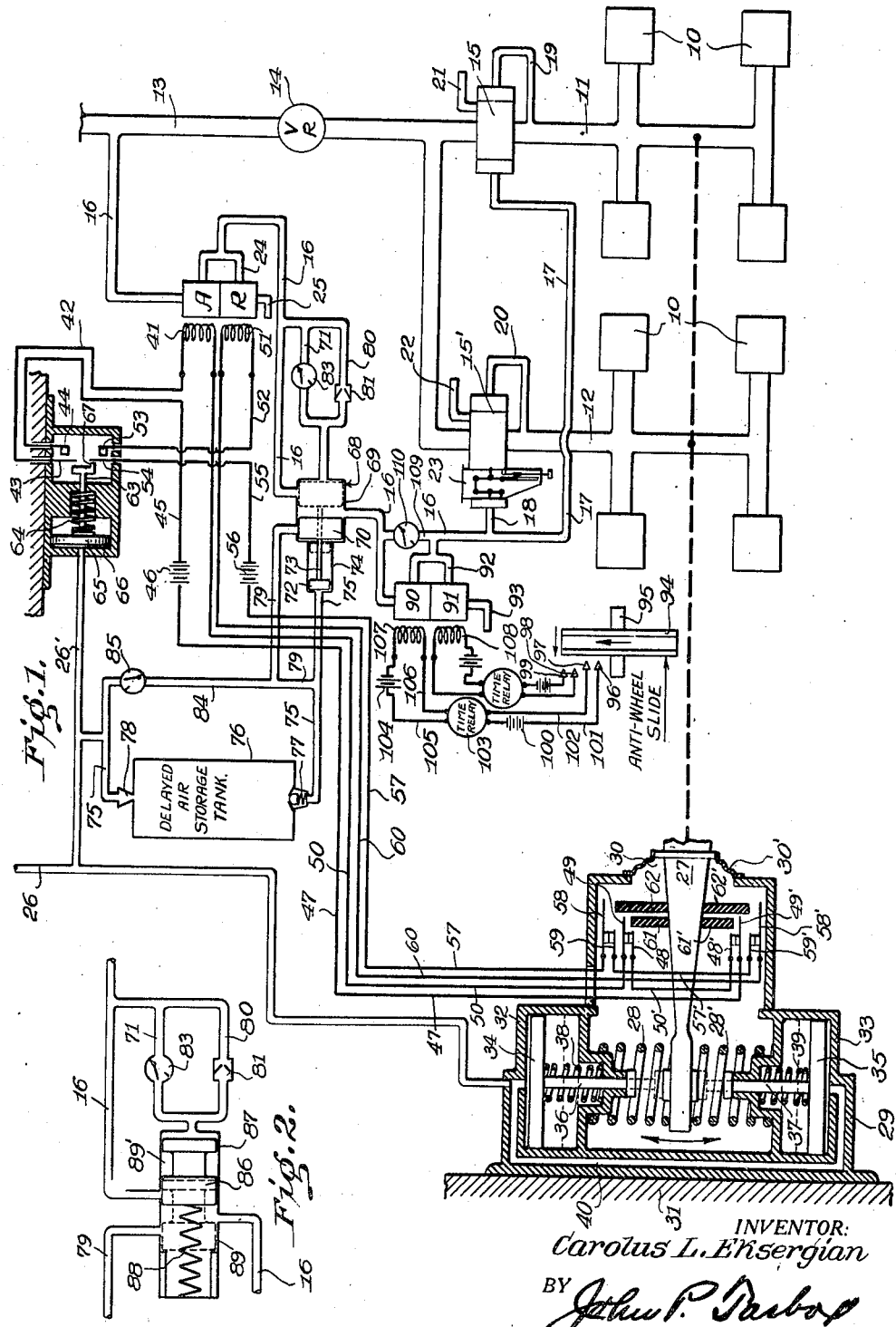
INVENTOR:
Carolus L. Eksergian
BY John P. Barbor
ATTORNEY Patented Jan. 19, 1943

2,308,500

UNITED STATES PATENT OFFICE 2,308,500

BRAKING SYSTEM AND CONTROL THEREFOR

Carolus L. Eksergian, Detroit, Mich., assignor to Budd Wheel Company, Philadelphia, Pa., a corporation of Pennsylvania Application May 1, 1939, Serial No. 271,082

10 Claims. (Cl. 303—21)

The invention relates to brakes and particularly to a control for brakes operated by air.

It is an object of the invention to provide a brake control of this class in which the braking system is controlled conjointly by the pressure application under the control of the operator and the torque exerted by the brakes.

It is a further object to provide a control of this class in which the operator may take over the control independent of the torque, if the torque control fails to operate.

A further object of the invention is the provision of an anti-wheel slide control in association with the system which takes over the control in case of wheel slide.

Other and further objects and advantages will become apparent from a reading of the following detailed description, when read in connection with the drawing forming a part hereof.

In the drawing:

Fig. 1 is a diagrammatic representation of a brake control system according to the invention.

Fig. 2 is a fragmentary detail view showing a modification of the gate valve shown in Fig. 1.

In the diagrammatic showing of Fig. 1 in the lower right of the diagram I have illustrated eight brake cylinders 10 in two groups of four each. Each group applies to the wheels of a single four wheel truck and the brakes associated therewith, and it is assumed that the system at large is applied to a vehicle employing two of these trucks. The cylinders 10 of each group are connected in common to branch lines 11 and 12 respectively, leading from the main line 13 from the main air reservoir (not shown). Preferably the air pressure acting in the cylinders 10 is under reduced pressure from that in the main cylinder and this may be attained by placing in the main line 13 a suitable form of reducing valve 14.

Air under pressure is admitted to the cylinders 10 of each group through relay valves 15 and 15', such as piston valves, inserted respectively, in the branch lines 11 and 12. These relay valves are adapted to operate by a pilot line 16 having branches 17 and 18 connected to the respective valves 15 and 15', and the pilot lines 16 connects into the main line 13 so that the air is delivered to said line at the pressure of the air in the main reservoir.

The opposite ends of the valves 15 and 15' from the ends connected to the branches 17 and 18 from the pilot line 16 are connected by short lines 19 and 20 to the respective lines 11 and 12 in turn connected to the respective groups of brake cylinder 10. It will thus be seen that the relay valves are subject to differential pressures, the pressure in the branch lines 17 and 18, being directly connected to the main reservoir at all times when line 16 is open predominating over the pressure in lines 19 and 20, in which the pressure is substantially the brake cylinder pressure.

The detail structure of these valves 15 and 15' may vary greatly, but may be similar to that diagrammatically shown and described in my copending application No. 271,081, filed of even date herewith.

Suffice it to say that when the pilot line 16 is open to admit compressed air from the main reservoir to the relay valves they are opened to admit air to the brake cylinders to apply the brakes. When the pressure is reduced in the pilot line by means to be hereinafter described until it falls below the pressure in the brake cylinders and lines 11, 19 and 12, 20 directly communicating with the respective groups of cylinders, the relay valves 15 and 15' are operated to shut off the lines 11 and 12, respectively, and to connect the brake cylinders to the exhaust lines 21 and 22 associated with the respective valves 15 and 15'.

An infinitely variable ratio device 23 is diagrammatically indicated in association with relay valve 15'; this device being provided when it is desired to vary the brake cylinder pressures in the two groups of cylinders in accordance with the variable load carried by the trucks with which the cylinders are associated. Detailed description of this device is believed unnecessary herein, the device being essentially similar to that fully described in my copending application No. 271,081.

To control the passage of compressed air in pilot line 16, an application valve designated diagrammatically at A is provided, this valve being operable to close or open the line 16. To release the air pressure in line 16 on the side of valve A opposite the connection to the main line 13 a short branch line 24 leads from line 16 through a release valve R to an exhaust line 25. When the brakes are off the valve A is normally closed shutting off the line 16 and the valve R is normally open connecting the brake cylinder side of line 16 to the exhaust.

From the foregoing, it will be seen that the opening of the application valve A and the closing of the release valve R applies the brakes and that the pressure built up in the brake cylinders is dependent on the pressure in the main reservoir and the line 13 leading therefrom.

In order to bring the control of the braking jointly under the control of the operator and the torque developed by the brakes, I have provided a control device for operating the valves A and R which is dependent upon these conjoint factors. I have shown an electrical system for operating the valves A and R which system is controlled by the air pressure in an operator's control line 26, the pressure in which is selected by the operator, and by the movement of a torque member, as arm 27 which is movable under the influence of the torque developed by the brakes, but whose movement is opposed by the air pressure in control line 26 and by calibrated springs 28 and 28' arranged respectively, above and below the end of the arm.

Such arm may be the free end of the brake supporting frame, the opposite end of which is supported to rotate concentric with an axle of the truck with which it is associated, an embodiment of which is disclosed in my copending application Serial No. 198,398, filed March 28, 1938, now Patent #2,228,818, issued January 14, 1941.

The mechanism associated with the free end of the arm 27, as shown, may comprise a casing as 29 into which the arm extends through an opening 30 normally closed by a flexible dust cover 30'. This casing may be rigidly secured to the truck frame indicated at 31. Cylinders 32 and 33 are arranged on opposite sides of the arm 27 in line with the springs 28 and 28' which bear at their ends remote from the arm against the heads of these cylinders, respectively. Pistons 34 and 35 having piston rods 36 and 37 projecting into the proximity of the opposite sides of the arm 27, operate in the cylinders 32 and 33 and are urged outwardly to the outer ends of the cylinders by light springs 38 and 39, respectively.

Air is admitted to the outer sides of the pistons through ports in the outer cylinder heads which communicate with each other through conduit 40 in the wall of the casing 29 and with the control line 26.

Thus it will be seen that the movement of the torque arm 27 is constrained not only by the springs 28 and 28' but also by the air pressure in the operator's control line 26. While two sets of springs and pistons have been shown one arranged above and the other below the arm, it will be understood that only one set will be normally operative to constrain the movement of the arm, the arm tending under the braking torque to move in one direction or the other, i. e. up or down, depending upon the direction of movement of the truck with which it is associated.

The electrical system controlling the valves A and R and in turn controlled by the operator through the control line 26 and the torque arm 27 comprises two electric circuits, one for each valve.

The circuit controlling valve A comprises the electromagnet 41, lead 42, flexible switch contact 43, its opposed contact 44, lead 45, battery or other power source 46, lead 47, flexible switch contact 49', switch contact 48', lead 50', switch contact 48, flexible opposed contact 49, and lead 50.

The circuit controlling valve R is essentially similar and comprises the electromagnet 51, lead 52, switch contact 53, opposed flexible contact 54, lead 55, battery 56, lead 57, flexible switch contact 58, opposed switch contact 59, lead 57', switch contact 59', flexible contact 58', and lead 60.

The switches formed by contacts 43, 44 and 53, 54 are normally open, while the switches formed by contacts 48, 49 or 48', 49' and 58, 59 or 58', 59' are normally closed. Insulated circuit breakers 61 and 62 or 61' and 62' are arranged on the torque arm 27 for cooperation, respectively, with the switches 48, 49 and 58, 59, or 48', 49' and 58', 59' these circuit breakers successively engaging the flexible switch contacts 49 and 59 or 49' and 59', depending upon the direction of movement, to move them away from their cooperating contacts to break the circuits upon predetermined movement of the arm under the influence of the braking torque.

It will be noted that the pairs of switches 48, 49 and 48', 49' and 58, 59 and 58', 59' are arranged in series in their respective circuits, and the switches of a pair are arranged above and below the torque arm 27, so that the circuits are controlled by the movement of the torque arm for either direction of movement of the car.

The system so far described operates as follows: When the operator wishes to apply the brakes, he admits air at the selected pressure into the control line 26 which forces the piston rods 36 and 37 to the dotted line positions, Fig. 1 in contact with the arm 27 to hold it central and against movement. At the same time through branch line 26' the air operates a circuit closer 63 against the pressure of a light spring 64 by operating on the piston 65 sliding in cylinder 66 and connected to the circuit breaker. The circuit breaker has a high point 67 which engages the flexible contact 54 and first closes the switch 53, 54 and immediately thereafter the low portion of the circuit closer, by engaging the flexible contact 43 closes the switch 43 and 44. Thus the control circuits to release valve R and application valve A are successively closed, resulting in the successive closing of the release valve and opening of the application valve. The opening of the application valve, causes the compressed air in the pilot line 16 to operate the relay valves 15 and 15' to open communication from the main reservoir line 13 to the brake cylinders to apply the brakes. The torque immediately starts to build up but movement of the arm 27 by the brakes connected to it is prevented by the air pressure back of the piston 34 and the pressure of spring 28, assuming the torque moves the arm upwardly, until the torque reaches a maximum value for the given selected pressure. Then the arm moves, first to open the switch 48, 49 in the application valve control circuit, and this results in the closing of said valve. When the arm moves away from its central position toward cylinder 32, the piston 35 in cylinder 33 cannot follow it since it is up against the end of its cylinder as shown by the dotted lines.

If the torque does not continue to rise, or if it gradually drops, because air is no longer admitted to the brake cylinders or for any other reason, the arm similarly drops to allow the application valve circuit to close, thus opening the valve and again admitting air to the brake cylinders.

If the torque, on the other hand continues to rise after the application valve has been closed, the arm 27 will continue to rise until it opens the switch 58, 59 in the release valve circuit which results in opening the release valve to exhaust. The pressure in the brake cylinders then causes the relay valves to close their connection to the main reservoir and to connect them to the exhaust, thus reducing the pressure in the brake cylinders. The torque immediately drops, thus returning the parts to the position in which the brakes are again applied, assuming the operator still calls for the selected pressure in the control line.

If the operator calls for increased pressure in the control line, the torque may reach a new high before the herein described automatic control of the application and release valves takes place.

To insure that the brakes can be operated should the electrical system fail and the application valve A remain closed, I provide connections between the operator's control line 26 and the pilot line 16 in that portion thereof extending between the application valve A and the relay valves 15 and 16, whereby compressed air can be admitted to the pilot line at the selected pressure in the control line, and the brakes controlled directly from the control line independent of the torque control.

To this end, a gate valve, designed generally by the reference numeral 68 is placed in the pilot line 16. This valve may consist of a cylindrical casing 69 in which is mounted a piston valve 70 slidable from one end of the cylinder to the other. The inlet and outlet orifices of line 16 are so arranged that when the piston valve is at the left hand end of the casing, as shown in full lines, they are in free communication. Pressure in the pilot line 16 is admitted through a by-pass line 71 into the right hand end of the cylinder casing to normally move the piston valve to the left hand end and hold it in that position.

The piston valve 70 is connected to a smaller diameter piston 72 by a rod 73, this smaller piston working in reduced diameter extension 74 from the left hand end of the main casing. This piston 72 is acted on by air pressure admitted thereto through a branch line 75 leading from branch line 26' connected to operator's control line 26 to the left hand end of the reduced cylinder extension 74.

A delayed air storage tank 76 is inserted in line 75, the purpose of this tank being to delay the building up of pressure behind reduced piston 72 until the pressure has been built up through pilot line 16 behind the opposed face of piston valve 70. A spring pressed check valve 77 prevents passage of air from storage tank 76 into line 75 leading to the gate valve until a predetermined pressure has been built up in the storage tank. The air enters the tank through a small orifice 78 which further delays the building up of pressure behind piston 72.

With this arrangement, and in view of the differential pressures acting on the gate valve, it will be seen that in the normal operation the pilot line 16 is always open and the system acts just as if it were not inserted in the line. If however, due to the failure of the electrical system or for any other reason, the pressure in the pilot line 16 drops substantially below the pressure in operator's control line 26, then, notwithstanding the differential areas of the pistons 70 and 72, the air pressure in line 26 and branch 75 will take control, and move the gate valve to the right hand end of the cylinder, as shown in dotted lines, thus connecting the branch line 79 from line 75 with the outlet port to pilot line 16. The brakes will then be controlled direct from the operator's control line 26.

In such movement of the gate valve, the air at the right hand end of the cylinder casing 69 is permitted to escape through a by-pass 80 provided with a restricted orifice 81 to slow up the escape of air and thus cushion the movement of the piston valve 70. During this movement the check valve 83 in by-pass 71 is closed by the back pressure of the air.

By reason of the differential areas of pistons 70 and 72 it will be seen that normal control of the braking through pilot line 16 and main reservoir line 13 may obtain even if the pressure in the pilot line 16 should fall substantially below the pressure called for by the operator in the control line 26. This is as it should be, since lower brake cylinder pressure than the called for pressure may at times be desirable.

A by-pass line 84 is provided between line 79 and line 26' connected to control line 26, this line permitting the return of air to line 26, when the pressure in the line is reduced by the operator. This by-pass is normally closed when pressure is increased in line 26 by the check valve 85.

From the foregoing description, it will be seen that the braking may be entirely controlled from the operator's control line 26 in the event of failure of pressure in the pilot line 16 leading to the gate valve 68. This furnishes a desirable safety factor.

In Fig. 2 I have diagrammatically shown a modified form of gate valve in which the movable piston valve 86 slides in a cylindrical casing 87 under the opposed forces of the pressure in pilot line 16 and a spring 88 arranged between the left hand ends of the piston and casing. A stop shoulder 89 is provided to stop the leftward movement of the piston under the pressure in line 16 in a position where it closes off the communication between line 79 and outlet port of line 16. When the piston is in this position as shown in dotted lines it establishes communication between the inlet and outlet ports of line 16 through the annular groove 89' between the ends of the piston.

Since it is desirable to set the control to secure the maximum permissible torque as defined by rail adhesion, if the rail adhesion drop due to poor rail conditions, there may be times when wheel slide would occur. To guard against this, I may associate with the pressure torque control system, hereinbefore described, an antiwheel slide system which comes into action upon wheel slip and just before the wheel slide is likely to occur, to further reduce the pressure in the brake cylinders and thereby prevent wheel slide.

This anti wheel slide system may comprise any suitable governor, either centrifugally actuated or inertia-actuated and an electric circuit or circuits controlled thereby and in turn operative to control the pressure in the brake cylinders. In the drawing of Fig. 1 such a system is diagrammatically illustrated in association with the brake control system hereinbefore described.

A second set of application and release valves which may be generally similar to the valves A and R already described, and designated respectively, by reference numerals 90 and 91 are inserted in the pilot line 16 between gate valve 68 and the relay valves 15 and 15'. The application valve 90 as in this instance is normally open to permit to flow in this section of line 16, and release valve 91 which is connected to line 16 by a branch line 92 and is arranged to connect this branch to the exhaust line 93, is normally closed.

These valves are controlled from the anti wheel slide governor, indicated generally by numeral 94, and which is adapted to move in the direction of its axis 95 when wheel slide is imminent, toward two pairs of switch points 96, 97 and 98, 99. An electrical system is associated with each pair of switch points and the corresponding valves to operate the valves when the circuits are closed by the engagement of the governor with the switch points. The systems associated with application and release valves are similar and since this is so, only the system associated with application valve 90 need be described in detail.

It comprises two electrical circuits one including a source of power 100, leads 101 and 102, and a suitable time relay 103. When this circuit is closed through the switch points 96, 97 engaging the governor 94 the time relay is actuated to thereafter close the other circuit including the time relay the source of power 104, the leads 105 and 106 and the electromagnet 107. When this circuit is energized the electromagnet operates the application valve to closed position. If, after the application valve is closed, the wheel still continues to slow down, the governor moves laterally further to close the switch 98, 99 which energizes the similar electrical system to that described in connection with the application valve 90, including electromagnet 108 associated with the relief valve 91 to actuate the relief valve to open position, thereby connecting the pilot line to the exhaust and thus reducing the pressure in the brake cylinders to correct the tendency to wheel slide.

As soon as the wheel or wheel axle picks up speed the circuits are opened and the valves 90 and 91 return to their normal positions.

To enable the operator to release the brakes in the event of failure of the electrical systems controlled by the anti-wheel slide governor or if, for any other reason, both the application and release valves 90 and 91 should be simultaneously held closed, when the brakes are on, a by-pass 109 in which is inserted a check valve 110 is provided in line 16 to by-pass the valves 90 and 91 and cut out the anti-wheel slide control. This by-pass is normally closed but is moved to open position for the release of pressure in the brake cylinders controlled by pilot line 16.

While I have herein disclosed a specific embodiment of the invention, it will be understood that many changes and modifications may be made such as come within the skill of one working in this art, and such changes and modifications are intended to come within the scope of the appended claims.

What I claim is:

1. A braking system for fluid operated brakes comprising a brake cylinder, a main reservoir line connected with said cylinder, means associated with said main reservoir line controlling the flow of fluid under pressure from said line to the brake cylinder, said means including a pilot line connected into the main reservoir line, and means in said pilot line, controlled jointly by pressure in an operator's control line and by the torque force developed by the brakes and acting in opposition to said pressure to regulate the action of the brakes.

2. A braking system for fluid operated brakes comprising a brake cylinder, a main reservoir line to supply fluid to the brake cylinder, control means for connecting and disconnecting the main reservoir line with the brake cylinder, said means including a pilot line connected into the main reservoir line, and valve means in the pilot line controlled jointly by the selected pressure in an operator's control line and by the torque force developed by the brakes under a given selected pressure, the torque force acting in opposition to said selected pressure.

3. A braking system for fluid operated brakes comprising brake cylinder, a main reservoir line for supplying fluid to the cylinder, and control means including an operator's control line for regulating the pressure in said cylinder including automatic means responsive jointly to the selected pressure in the operator's control line and to the torque developed by the brakes associated with said cylnder, and additional means for cutting out the automatic means and for thereafter regulating said pressure independently of said automatic means from the operator's control line in the event of failure of said automatic control means.

4. A braking system for fluid-operated vehicle brakes, comprising a brake cylinder, a main pressure supply line for supplying braking fluid to said cylinder and control means for regulating the pressure in said cylinder operative jointly by an operator's' selective pressure control line and a torque controlled member movable under the torque exerted by the brakes and means whereby the operator's selective pressure line is automatically made operative to regulate the pressure in said cylinder independently of said torque controlled member upon failure of the control in which said member has a part.

5. A braking system for fluid-operated brakes comprising a brake cylinder, a main pressure supply line for supplying braking pressure to said cylinder, a relay valve in said line, a pilot line connected to said relay valve and said main supply line for operating the relay valve, valve means in said pilot line normally cutting off the portion of said line toward the brake cylinder and connecting it to exhaust, and semi-automatic means for controlling said valve means to regulate the braking including an operator's control line and a torque controlled member.

6. A braking system for fluid operated brakes comprising a brake cylinder, means for supplying fluid under pressure to said cylinder including a main pressure supply and means for regulating the pressure supplied to the cylinder, said regulating means including a pilot line from said main pressure supply and an independent operator controlled line, both said lines being connected to the inlet side of a gate valve having a common outlet, said gate valve being normally under differential pressure, and movable normally to close the inlet thereto from the operator's control line and to open the inlet from the pilot line, but movable, if the pressure in the pilot line drops to a predetermined low, to a position closing the inlet from the pilot line and opening the inlet from the operator controlled line.

7. A braking system for fluid operated brakes comprising a brake cylinder, a main supply line for supplying fluid to said cylinder to apply the brakes, and a control means for regulating the pressure in said cylinder including means responsive jointly to selected pressure in an operator's control line and to torque developed by the brakes associated with said cylinder, and means rendering said operator's control line operative to regulate the pressure in said cylinders independently of said developed torque, said last-named means being inoperative for a time after the selected pressure is applied in the control line.

8. A braking system according to claim 6 in which the gate valve is acted upon at one end by the pressure in the pilot line acting thereon over a large area, and at the other end by the pressure in the operator controlled line acting thereon over a smaller area.

9. A braking system according to claim 6 in which the gate valve is acted upon at one end by the pressure in the pilot line and at the opposite end by a relatively small spring pressure.

10. A braking system for fluid operated brakes comprising a brake cylinder, a main line for supplying fluid under pressure to said cylinder and means for controlling the admission to and release of pressure from said brake cylinder, including a pilot line connected in the main line and a normally closed valve in said pilot line, electrical means for operating said valve said electrical means being rendered operative to open said valve initially upon the application of pressure in an operator's control line, the position of the valve during the application of pressure to the brake cylinder being controlled jointly by the pressure in the operator's control line and a member movable under the torque delivered by the brakes.

CAROLUS L. EKSERGIAN.